US007683361B2

(12) United States Patent
Edamatsu et al.

(10) Patent No.: US 7,683,361 B2
(45) Date of Patent: Mar. 23, 2010

(54) METHOD FOR GENERATING QUANTUM-ENTANGLED PHOTON PAIRS

(75) Inventors: Keiichi Edamatsu, Natori (JP); Tadashi Itoh, Toyonaka (JP)

(73) Assignee: Japan Science & Technology Agency, Saitama (JP)

( * ) Notice: Subject to any disclaimer, the term of this patent is extended or adjusted under 35 U.S.C. 154(b) by 440 days.

(21) Appl. No.: 11/587,003

(22) PCT Filed: Nov. 2, 2004

(86) PCT No.: PCT/JP2004/016429

§ 371 (c)(1),
(2), (4) Date: Oct. 20, 2006

(87) PCT Pub. No.: WO2005/103810

PCT Pub. Date: Nov. 3, 2005

(65) Prior Publication Data

US 2007/0216991 A1      Sep. 20, 2007

(30) Foreign Application Priority Data

Apr. 20, 2004   (JP) ............................ 2004-124716

(51) Int. Cl.
H01L 33/00 (2006.01)

(52) U.S. Cl. .............................. 257/13; 257/17; 257/21; 257/97; 372/92

(58) Field of Classification Search ............... 250/493.1; 315/1; 356/36; 257/13
See application file for complete search history.

(56) References Cited

U.S. PATENT DOCUMENTS

| 3,719,423 | A | * | 3/1973 | Leheny et al. ................. 356/36 |
| 4,639,638 | A | * | 1/1987 | Purcell et al. ................. 313/534 |
| 5,032,489 | A | * | 7/1991 | Kobayashi et al. ......... 430/270.14 |
| 5,418,424 | A | * | 5/1995 | Aprile et al. ..................... 315/1 |
| 5,607,601 | A | * | 3/1997 | Loper et al. .................. 438/708 |
| 6,424,665 | B1 | * | 7/2002 | Kwiat et al. .................... 372/21 |
| 6,864,501 | B2 | * | 3/2005 | Shields et al. ................... 257/13 |
| 6,960,779 | B2 | * | 11/2005 | Shields et al. ................... 257/13 |
| 7,132,676 | B2 | * | 11/2006 | Shields et al. ................... 257/14 |
| 2002/0030186 | A1 | * | 3/2002 | Tomita .......................... 257/14 |
| 2003/0218143 | A1 | * | 11/2003 | Shields et al. ............. 250/493.1 |

(Continued)

OTHER PUBLICATIONS

G. Ohata et al., "Handotai o Mochiita Ryoshi Motsure Koshitui no Seisei", Nippon Butsuri Gakkai Koen Gaiyoshu, vol. 59(1), separate vol. 2, p. 186 (2004).

(Continued)

Primary Examiner—Nikita Wells
Assistant Examiner—Johnnie L Smith
(74) Attorney, Agent, or Firm—Nixon & Vanderhye

(57) ABSTRACT

A method for generating a quantum-entangled photon pair is such that a biexciton in such a state that the angular momentum is 0 is generated through two-photon resonance induced by irradiating a semiconductor substance, e.g., CuCl, with two parent photons (angular frequency $\omega i$). A photon pair is then generated by splitting the biexciton thus generated simultaneously into two photons (angular frequencies $\omega s$ and $\omega s'$). Since the photon pair is generated by splitting such biexciton having an angular momentum of 0, it has a quantum entanglement with regard to polarization. Since the photon thus generated has a wavelength substantially equal to that of the parent photons, photons of shorter wavelength in a quantum entangled state can be generated.

3 Claims, 6 Drawing Sheets

U.S. PATENT DOCUMENTS

| | | | |
|---|---|---|---|
| 2004/0036877 A1* | 2/2004 | Sergienko et al. | 356/369 |
| 2004/0078421 A1* | 4/2004 | Routt | 709/201 |
| 2005/0006593 A1* | 1/2005 | Kastella et al. | 250/458.1 |
| 2008/0089696 A1* | 4/2008 | Furuta | 398/175 |
| 2008/0212186 A1* | 9/2008 | Zoller et al. | 359/577 |

OTHER PUBLICATIONS

K. Edamatsu et al., "Handotai no Hyper Parametric Sanran o Mochiita Ryoshi Motsure Koshitui no Seisei", Ryoshi Joho Tushin to Ryoshi Nano Device ni Kansuru Kokusai Symposium Koenshu, p. 8 (2004).

K. Edamatsu et al., "Generation of entangled photon pairs through hyper-parametric scattering in a semiconductor", International Symposium on Photonics and Spintronics in Semiconductor Nanostructures (2003).

A. Boto et al., "Quantum Interferometric Optical Lithography: Exploiting Entanglement to Beat the Diffraction limit", Physical Review Letters, 85, p. 2733-2736 (2000).

D. Strekalov et al., "Two-photon interferometry for high-resolution imaging", J. Mod. Opt., 49, p. 519-527 (2002).

P. Kwiat et al., "New High-Intensity Source of Polarization-Entangled Photon Pairs", Physical Review Letters, 75, p. 4337-4341 (1995).

P. Kwiat et al., "Ultrabright source of polarization-entangled photons", Physical Review A, 60(2), p. R773-R776 (1999).

C. Santori et al., "Polarization-correlated photon pairs from a single quantum dot", Physical Review B, 66, p. 045308-1-045308-4 (2002).

S. Savasta et al., "Entangled photon pairs from the optical decay of biexcitons", Solid State Communications, 111, p. 495-500 (1999).

O. Benson et al., "Regulated and Entangled Photons from a Single Quantum Dot", Physical Review Letters, 84, 11, p. 2513-2516 (2000).

* cited by examiner

METHOD FOR GENERATING QUANTUM-ENTANGLED PHOTON PAIRS

This application is the US national phase of international application PCT/JP2004/016249 filed 2 Nov. 2004, which designated the U.S. and claimed priority of JP 2004-124716 filed 20 Apr. 2004, the entire contents of each of which are hereby incorporated by reference.

TECHNICAL FIELD

The present invention relates to a method for generating photon pairs in a quantum entangled state.

BACKGROUND ART

Cryptographic techniques in information transmission have been studied in response to recent dramatic advance in information/communication technologies such as electronic commerce transactions, electric mails, etc. Quantum cryptography is one of cryptographic techniques, which draw much attention recently.

The quantum cryptography provides security by means of physical phenomenon by the uncertainty principle of Heisenberg in the quantum theory. According to the uncertainty principle, the state of quantum will be changed once it is observed, wiretapping (observation) of communication will be inevitably detectable. This allows to take measures against the wiretapping, such as shutting down the communication upon the detection of wiretapping. Thus, quantum cryptography makes wiretapping impossible physically. Moreover, the uncertainty principle explains that it is impossible to replicate particles.

Quantum teleportation is one of the key features of quantum cryptography. Quantum teleportation is a technique to transfer quantum information of the particles from one place where the particles exist to another place. The quantum teleportation is realized by information communication between photons by utilizing entanglement of quantum (quantum entanglement). Photon pairs in the quantum entangled state have such a property that once a quantum state of one of the photons is determined, then that of the other can be spontaneously determined. This property is not dependent on a distance between the photons.

Incidentally, optical lithography is utilized as a fine fabricating technique for semiconductors today. Lithography is a technique for forming an image based on an image transferred by exposure to light. In the conventional lithography, a limit of spatial resolution due to light diffraction makes it difficult to make fabrication finer than the order of light wavelength. On the other hand, quantum lithography, that is, a technique to attain a finer fabrication than the classical diffraction limit in the conventional technique by utilizing a phenomenon that de Broglie wavelength becomes shorter in a multiphoton in the quantum entangled state, has been proposed and studied. (see "A. N. Boto, P. Kok, D. S. Abrams, S. L. Braunstein, C. P. Williams, and J. P. Dowing, 'Physical Review Letters' 85 (2000) p. 2733-2736" and "D. V. Strekalov and J. P. Dowing, 'J. Mod. Opt' 49 (2002), p. 519.").

In the quantum teleportation and quantum lithography, photon pairs in the quantum entangled state are inevitably required.

So far, parametric down-conversion (PDC) by using a non-linear crystal has been used frequently to generate photon pairs in the quantum entangled state. (See P. G. Kwiat, K. Mattle, H. Weinfurter, and A. eilinger, "Physical Review Letters" 75 (1995) p. 4337-4341), and "P. G. Kwiat, E. Waks, A. G. White, I. Appelbaum, and P. H. Eberhard, "Physical Review A" 60, Number 2 (1999), R773-R776".

Meanwhile, generation of quantum-entangled photon pairs by using a semiconductor has been proposed recently. Especially, cascade light emission occurring in quantum dots by biexciton is disclosed in "C. Santoni, D. Fattal, M. Pelton, G. G. Solomon, and Y. Yamamoto, "Physical Review B" 66 (2002) 045308".

Moreover, in "S. Savasta, G. Martino, R. Girlanda, 'Solid State Communications' 111 (1999) p. 495-500", hyper parametric scattering (hyper Raman scattering), which is in resonance with biexciton in a semiconductor crystal, is theoretically pointed out.

However, in the parametric down-conversion, a pair of quantum-entangled photons is generated from a parent photon (pump photon) via second-order non-linear process. Thus, wavelengths of the photons thus generated are double that of the parent photon. Therefore, the parametric down-conversion is difficult to generate photon pairs in a short wavelength range, and inapplicable to generation of the quantum entanglement of multiphotons, quantum lithography, and the like.

Moreover, "C. Santoni, D. Fattal, M. Pelton, G. G. Solomon, and Y. Yamamoto, "Physical Review B" 66 (2002) 045308" discusses that structural asymmetry of quantum dots prevents generation of entangled photon pairs for polarization.

Furthermore, "S. Savasta, G. Martino, R. Girlanda,' Solid State Communications' 111 (1999) p. 495-500", is disclosure of a theory and leaves it uncertain whether the contents thereof can be reduced to practice or not. Moreover, this literature also discusses temporal correlation of the generated photon pairs, but does not disclose the quantum entanglement regarding polarization.

The present invention, which is accomplished in view of the aforementioned problems, has an object of attaining a method for generating quantum-entangled photon pairs, in which each photon is in a short wavelength, and which makes it possible to generate quantum-entangled photon pairs regarding polarization.

DISCLOSURE OF INVENTION

In order to attain the object, a method according to the present invention for producing a photon pair in quantum entangled state is arranged to include: radiating two parent photons to a semiconductor material, so as to induce two-photon resonance which generates biexciton that has an angular momentum of 0; and splitting the generated biexciton into two photons simultaneously, so as to generate the photon pair.

Here, the "quantum entanglement" is a state in which two particles share one wave function, and determination of a property of one of the particles determines a property of the other particle. The quantum entanglement (ryoshi motsure in Japanese) is also referred to as ryoshi karamiai in Japanese.

According to the above method, two parent photons are radiated to the semiconductor material, so as to generate biexciton. By using this biexciton, the photon pair is generated. Because of this, the photon pair thus generated has a wavelength substantially identical with that of the parent photons. This method makes it possible to easily produce a pair of photons in a shorter wavelength than in the conventional art in which generated photons have a wavelength double of that of parent photons.

Moreover, the biexciton, the intermediate product between the parent photons and the photon pair, has an angular momentum J of 0 (that is, the biexciton is in its ground state at which the biexciton is not polarized). This results in quantum entanglement of the photon pair in terms of polarization, the photon pair being produced by simultaneously splitting the biexciton. That is, this method makes it possible to produce photon pairs in the quantum entangled state in terms of polarization.

The photon pair thus generated is applicable to, e.g., quantum teleportation. That is, the photon pair thus generated is in the state of quantum entangled state in terms of polarization. Thus, determination of the polarization state of one of the photon readily determines the polarization state of the other photon regardless of a distance between the photons. This makes it possible to transfer information instantaneously.

Moreover, the photon pair thus generated is also applicable to, e.g., lithography. In lithography using light, which is a classic electromagnetic wave, a wavelength of the light can be regarded as de Broglie wavelength of one photon. In case of the photon pair in the quantum entangled state, however, the photon pair (a system composed of two photons) has a momentum double of that of the individual photons. Thus, the de Broglie wavelength of the photon pair is a half of the wavelength of one photon. As a result, the lithography using the photon pair can have spatial resolution improved to be double that of the conventional lithography. This attains finer fabrication than before.

For a fuller understanding of the nature and advantages of the invention, reference should be made to the ensuing detailed description taken in conjunction with the accompanying drawings.

BEST MODE FOR CARRYING OUT THE INVENTION

The present invention is a method for generating quantum-entangled photon pairs by utilizing resonant hyper parametric scattering in resonance to biexciton (a combination of two exciton) in a semiconductor crystal, the photon pairs being quantum-entangled in terms of energy (frequency), momentum (frequency vector) and polarization.

Firstly, hyper parametric scattering (Resonant Hyper Parametric Scattering: hereinafter RHPS) through which photon pairs are generated is explained.

Figure 1:
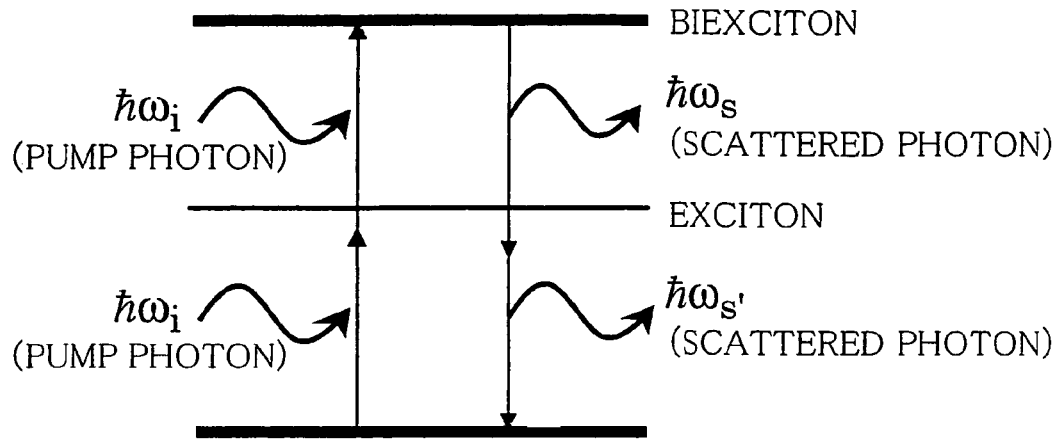
FIG. 1(a) is a view illustrating an energy state in hyper parametric scattering (RHPS).
FIG. 1(b) is a view illustrating a relationship between a curve of polariton dispersion in a two-dimensional wavenumber space and phase-matching condition of RHPS.
Figure 1:
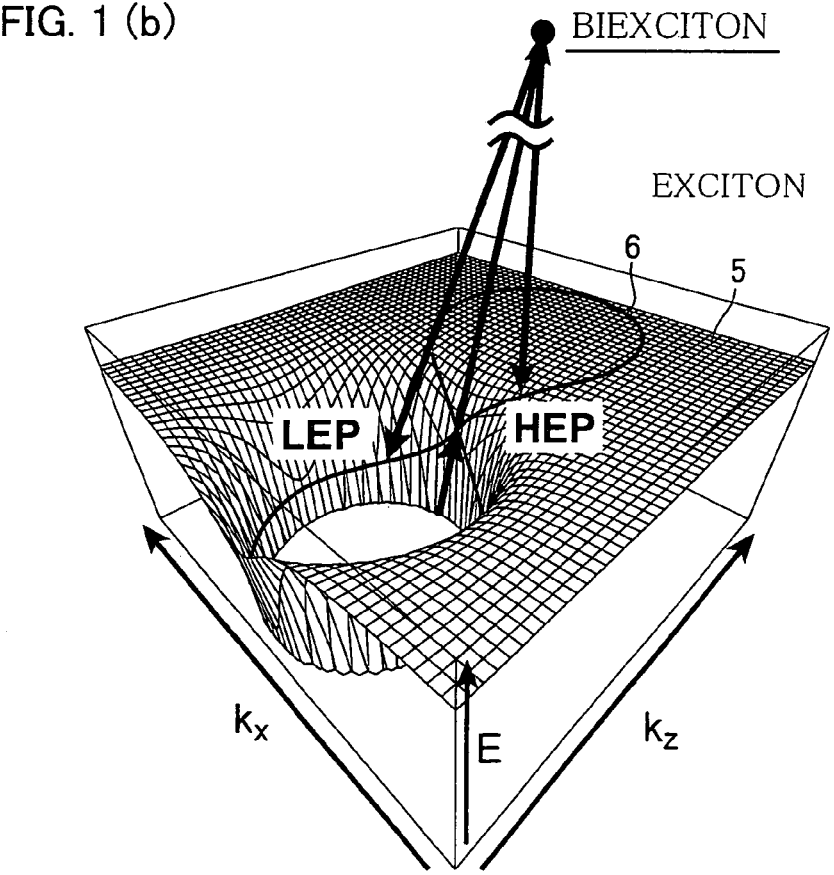

FIG. 1(a) is a view schematically illustrating an energy state in RHPS process. Two pump photons (parent photons) having an angular frequency ωi are radiated on a sample to induce two-photon resonance thereby to generate biexciton. The biexciton thus generated undergoes third-order non-linear optical process by which the biexciton is split into two photons (polaritons) without relaxation. Thereby, the photons are scattered as photon pairs having angular frequencies (ωs, ωs'), which are substantially equal to that of the pump photons.

FIG. 1(a) schematically illustrates biexciton and two photons split therefrom. In RHPS, it is necessary to take phase-matching condition into account. FIG. 1(b) is a view illustrating (i) plane 5 of polariton dispersion in two-dimensional frequency space, and (ii) the phase-matching condition of RHPS. The curve 6 on the plane 5 of polariton dispersion indicates conditions that satisfy the phase-matching condition. As illustrated in FIG. 1(b), photon pairs are generated from biexciton so that sum of energy and momentum of each photons is equal to that of the biexciton.

In Example of the present application, biexciton is generated by inducing two-photon resonance in such a manner that the generated biexciton has angular momentum J=0 (ground state of biexciton). When the angular momentum of biexciton is 0, the scattered photon pair from such biexciton will have angular momentum of 0 in sum. By this, the scattered photon pair falls into the state of quantum entanglement in terms of polarization.

The photon pair in the state of quantum entanglement regarding polarization has a function of a polarization state ψ expressed as follows:

$$\Psi = \frac{1}{\sqrt{2}}(|L_1 R_2\rangle + |R_1 L_2\rangle) = \frac{1}{\sqrt{2}}(|H_1 H_2\rangle + |V_1 V_2\rangle), \quad (1)$$

where $L_i$, $R_i$, $H_i$, and $L_i$ respectively represent the states for left-circular, right-circular, horizontal linear, and vertical linear polarizations of the respective daughter photons i.

The following explains Example which specifically exemplifies the method of the present invention for producing the photon pairs, and evaluation results of the generated photon pairs, referring to FIGS. 2 to 6.

Figure 2:
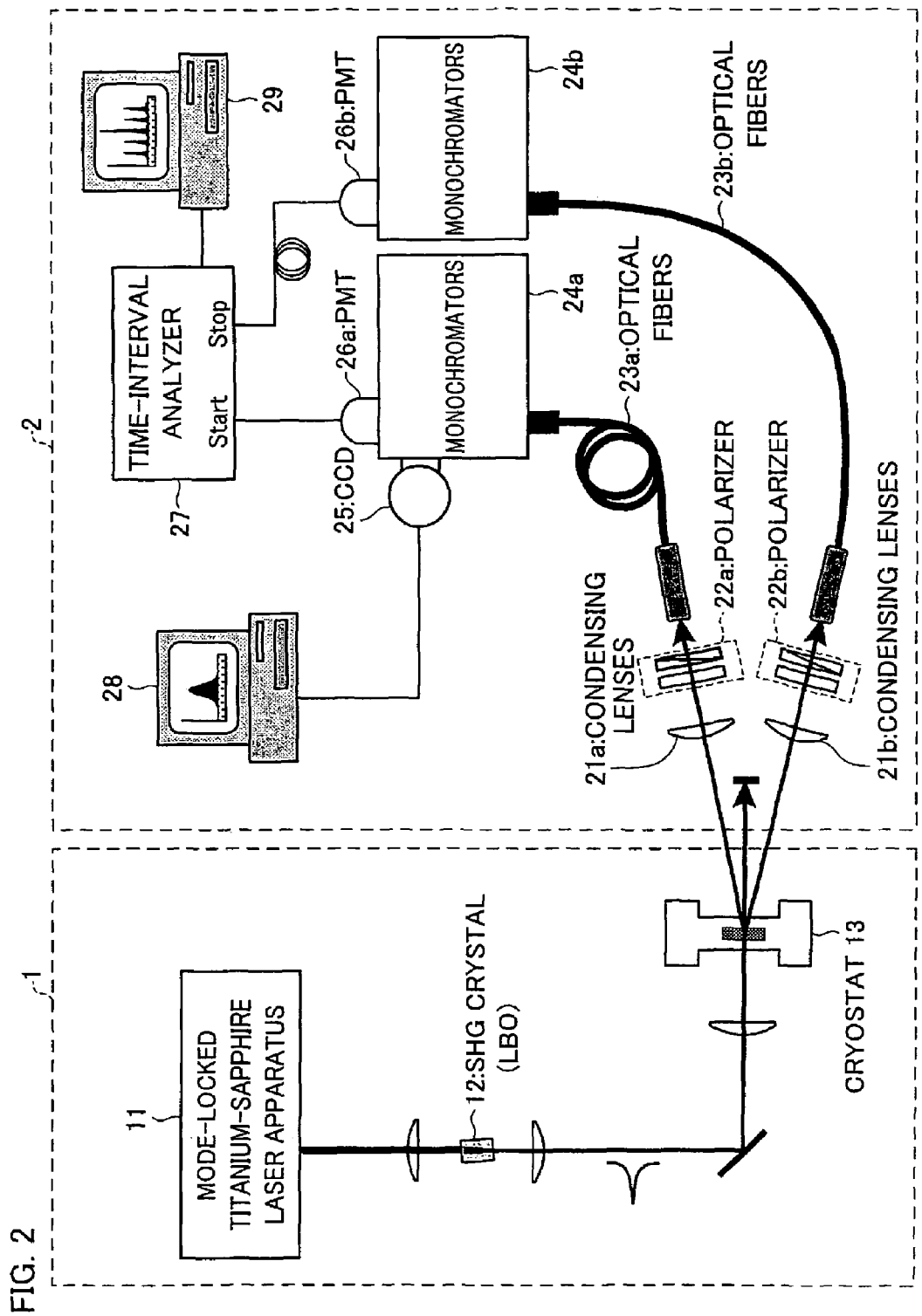
FIG. 2 is a plane view illustrating equipment for experiments used in Examples of the present inventions.

FIG. 2 is a block diagram illustrating a photon pair generating section 1 for generating photon pairs, and a property evaluating section 2 for evaluating properties of the generated photon pairs. As illustrated in FIG. 2, the photon pair generating section 1 includes a mode-locked titanium-sapphire laser apparatus 11, a second higher harmonics generating (SHG) crystal 12, and a low temperature maintaining apparatus (cryostat) 13. Moreover, the property evaluating section 2 includes condensing lenses 21a and 21b, polarizer 22a and 22b, optical fibers 23a and 23b, monochromators 24a and 24b, CCD (Charge Coupled Device) 25, photomultiplier tubes (PMT) 26a and 26b, a time-interval analyzer 27, and data processing apparatuses 28 and 29.

The mode-locked titanium-sapphire laser apparatus 11 is a titanium-sapphire laser apparatus for generating a laser beam in a short pulse. The mode-locked titanium-sapphire laser apparatus 11 outputs a laser beam in a predetermined wavelength, a predetermined pulse width, and a predetermined repetition frequency. The SHG crystal 12 is a crystal of lithium-triborate ($LiB_3O_5$:LBO) crystal. The SHG crystal 12 creates a second higher harmonics from the laser beam outputted from the mode-locked titanium-sapphire laser apparatus 11. Then, the created second higher harmonics is radiated to a sample placed in the cryostat 13, which maintains the sample at a low temperature.

The photon pairs from the sample in the cryostat 13 are scattered by RHPS. The condensing lenses 21a and 21b are configured to condense the scattered photons of the photon pairs to the optical fibers 23a and 23b. Before the optical fibers 23a and 23b, the polarizers 22a and 22b are respectively provided, each of which includes a quarter wave plate and a linear polarizer. Polarization state of the photons passing the polarizers 22a and 22b can be changed by configuring the polarizers 22a and 22b as appropriate. The optical fibers 23a and 23b are configured to guide, to the monochromators 24a and 24b, the photons that have passed through the polarizers 22a and 22b.

Different phase-matching conditions cause the photon pairs to be scattered by RHPS in different directions. Therefore, the condensing lenses 21a and 21b, polarizers 22a and 22b, and optical fibers 23a and 23b are arranged at appropriate positions to satisfy the phase-matching conditions.

The condensed photons are split into monochrome light of a predetermined wavelength via the two monochromators 24a and 24b. The number of photons of light split via the monochromators 24a and 24b is counted by the PMTs 26a and 26b. The time interval analyzer 27 measures temporal correlations of monopulse from the PMTs 26a and 26b with approximately 300 ps resolution. The data processing apparatus 29 is configured to display the data of analysis of the time interval analyzer 27, and perform predetermined data processing of the data.

The monochromator 24a is provided with the CCD 25 for monitoring spectrum of the light introduced into the monochromator 24a. The data processing apparatus 28 is configured to display the spectrum monitored by the CCD 25, and perform predetermined data processing of the spectrum.

In the present Example, a semiconductor monocrystal of cuprous chloride (CuCl) was used as the sample for generating the photon pairs. CuCl, which has a relatively large band gap (approximately 3.4 eV), is suitable for generating photon pairs in a short wavelength such as ultraviolet band. Moreover, CuCl monocrystal has a large binding energy for exciton and biexciton (approximately 200 meV for exciton, and approximately 30 meV for biexciton). Thus, CuCl monocrystal allows both exciton and biexciton to exist therein in a very stable state under low temperature. These properties make the CuCl monocrystal suitable for the experiment of the hyper parametric scattering that is in resonance to the biexciton.

The CuCl monocrystal was placed in the cryostat 13 in which a temperature of 4K was maintained. Moreover, the mode-locked titanium-sapphire laser apparatus 11 was adjusted to output such a laser beam that the pump photons emitted from the SHG crystal 12 was the second higher harmonics of the mode-locked titanium-sapphire laser (i.e., wavelength: 389 nm (ultraviolet band wavelength), pulse width: 8 ps, repetition frequency: 80 MHz). In this Example, the pump photons had a photon energy 3.1861 eV, which corresponds to the energy that is required to generate, in the CuCl monocrystal, biexciton of angular momentum J of 0 by two-photon resonance.

With this configuration, radiation of two pump photons onto the CuCl monocrystal generated one biexciton of angular momentum J=0 in the CuCl monocrystal, as illustrated in FIG. 1(a). The generated biexciton was split into two photons (photon pair). The process by RHPS proceeded in this manner in the CuCl monocrystal, thereby to scatter photon pairs. The scattered photons had a wavelength of approximately 390 nm, which was substantially equal to that of the pump photons.

The one of the scattered photon pairs was passed through the condensing lens 21a, polarizer 22a, and optical fiber 23a, and then condensed to the monochromator 24a. Similarly, the other one of the scattered photons was passed through the condensing lens 21b, polarizer 22b, and optical fiber 23b, and then condensed to the monochromator 24b.

Figure 3:
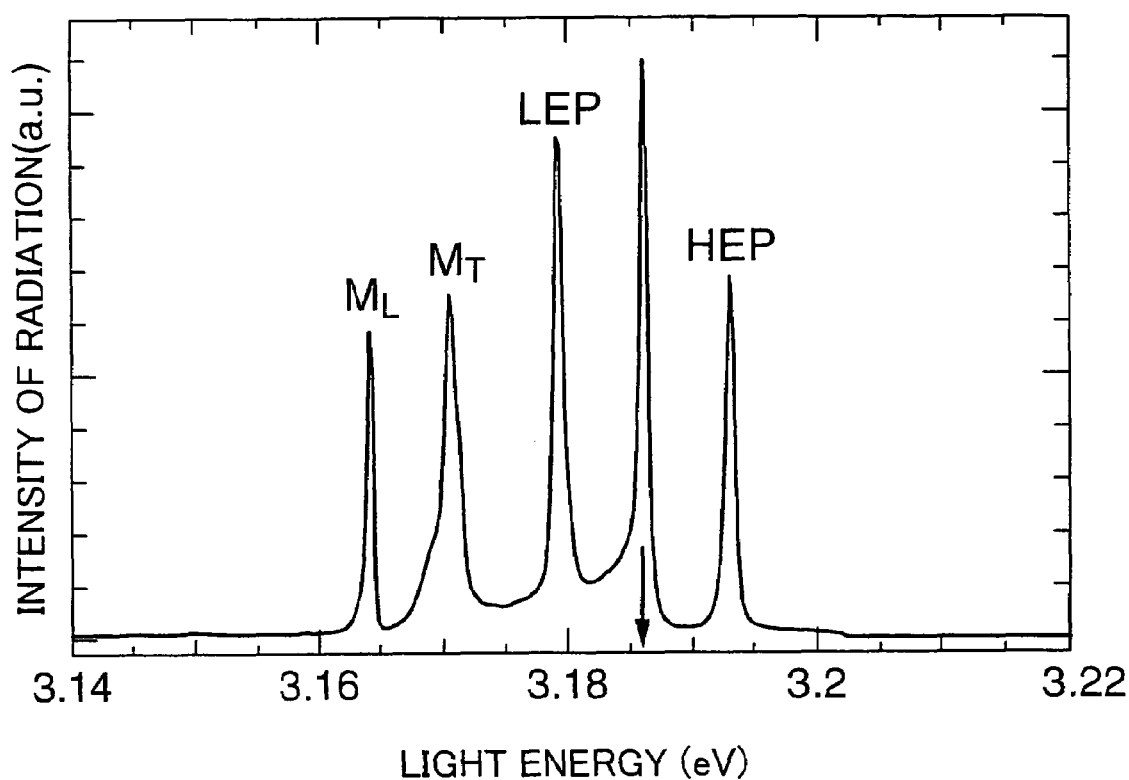
FIG. 3 is a spectral view illustrating distribution of scattering light from a sample when photon energy is applied.

FIG. 3 is a graph illustrating spectrum monitored at the monochromator 24a by the CCD 25. The maximum peak indicated by an arrow in FIG. 3 was the energy of pump light (3.1861 eV), and was Rayleigh scattering light of the pump light.

On both sides of the Rayleigh scattering light, two peaks having photon energies, which are symmetric to each other with respect to the Rayleigh scattering light, were observed (in FIG. 3, they are labeled as LEP (lower energy polariton) and HEP (higher energy polariton)). It can be understood that the photons of the two peaks had photon energy symmetric to each other in reference with the Rayleigh scattering light, thus, the sum of the energies is double the pump light, that is, corresponds to the energy of the biexciton whereby there was an energy correlation. Therefore, the two peaks were from the photon pairs scattered by RHPS. The peak labeled as LEP was of that one of the photon pairs which had a lower energy, whereas the peak labeled as HEP was of that one of the photon pairs which had a higher energy. The wavelengths of the peaks labeled as LEP and HEP were approximately 390 nm, which was substantially equal to the wavelength of the pump light.

Moreover, in FIG. 3, the peaks labeled as ML and MT are light emitting peaks obtained when the biexciton was broken down via a process different from RHPS. That is, part of biexcitons thus generated is broken down to leave longitudinal exciton or transverse exciton. This breaking-down of the excitons is accompanied by light emission. The peak labeled by ML is a light emission peak obtained when the biexciton was broken down to leave the longitudinal exciton. The peak labeled by MT is a light emission peak obtained when the biexciton was broken down to leave the transverse exciton. The left excitons remain as such for a while, and then decay into the ground state causing another exciton light emission. The biexciton light emission (ML, MT) and exciton light emission are light emission based on biexciton, like the light emission caused by RHPS. However, the biexciton light emission (ML, MT) and biexciton light emission relaxes in a finite time in which the excitons exist in the semiconductor crystal. This extinguishes the quantum entanglement between the biexciton light emission (ML, MT) and exciton light emission. The scattered photons due to RHPS and the components of ML, MT, and the exciton light emission are different in wavelength. Based on this, only the scattering photons due to RHPS was extracted at the monochromators 24a and 24b.

Figure 4:
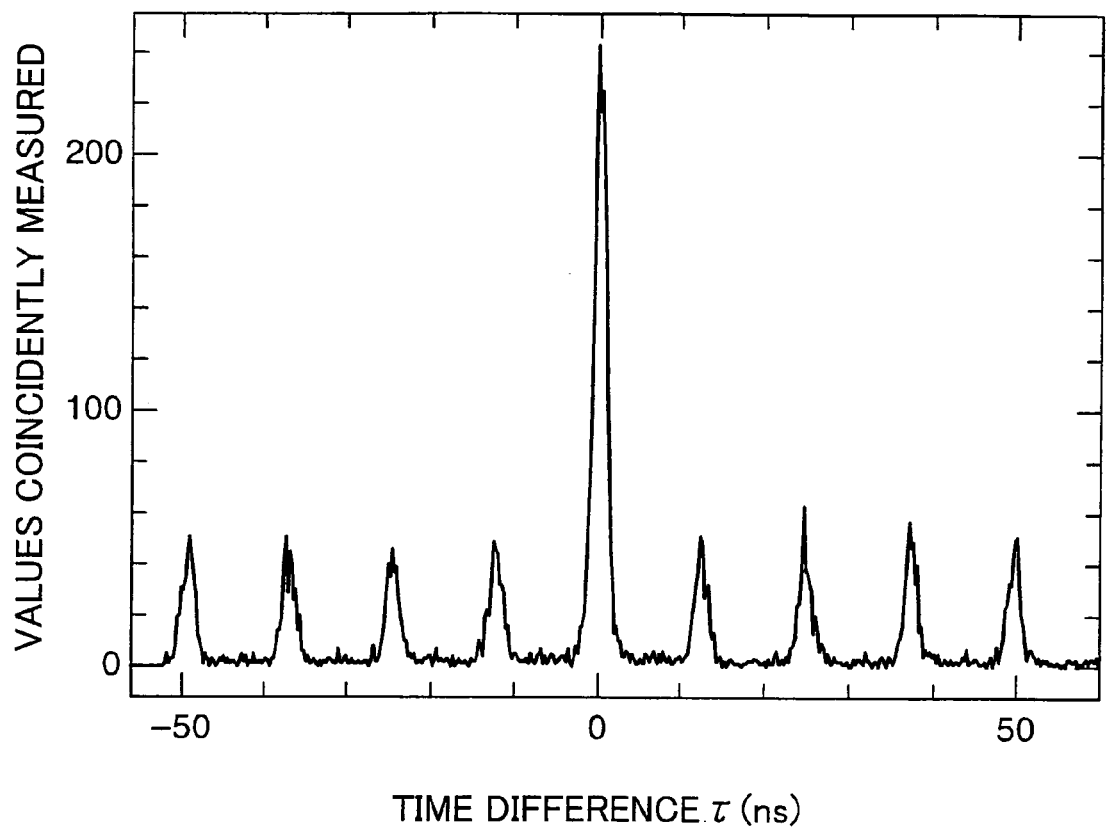
FIG. 4 is a graph illustrating temporal correlation between photons emitted by RHPS.

FIG. 4 shows results of analysis of time difference $\tau$ between the scattered photons emitted in the two directions from the CuCl monocrystal by RHPS. This time difference $\tau$ was analyzed based on the times at which the photons entered respectively in the monochromators 24a and 24b. Further, FIG. 4 shows results obtained when no polarization process using the polarizers 22a and 22b was carried out. In FIG. 4, the largest signal was obtained when the time difference $\tau=0$. This indicates that a photon pair having temporal correlation was generated from one biexciton.

Peaks other than the peak at the time difference $\tau=0$ were caused between photons having no correlation therebetween. The "photons having no correlation" are emitted from different biexcitons generated by pump pulses continuously introduced into the sample. The peak at the time difference $\tau=0$ also includes a peak component (non-correlation component) between the photons emitted from different biexcitons. The non-correlation peak component has the same quantity as the peaks other than the peak at the time difference τ=0.

As described above, biexciton with angular momentum J=0 was generated in the CuCl monocrystal by two-photon resonance, and the biexciton was spontaneously converted into the photon pairs. From the experiment results shown in FIG. 3, it was found that the converted photon pairs had energy correlation, meanwhile the experiment results shown in FIG. 4 demonstrated that the converted photon pairs had temporal correlation. Next, the inventors of the present invention confirmed whether or not the converted photon pairs were quantum-entangled in terms of polarization.

Figure 5:
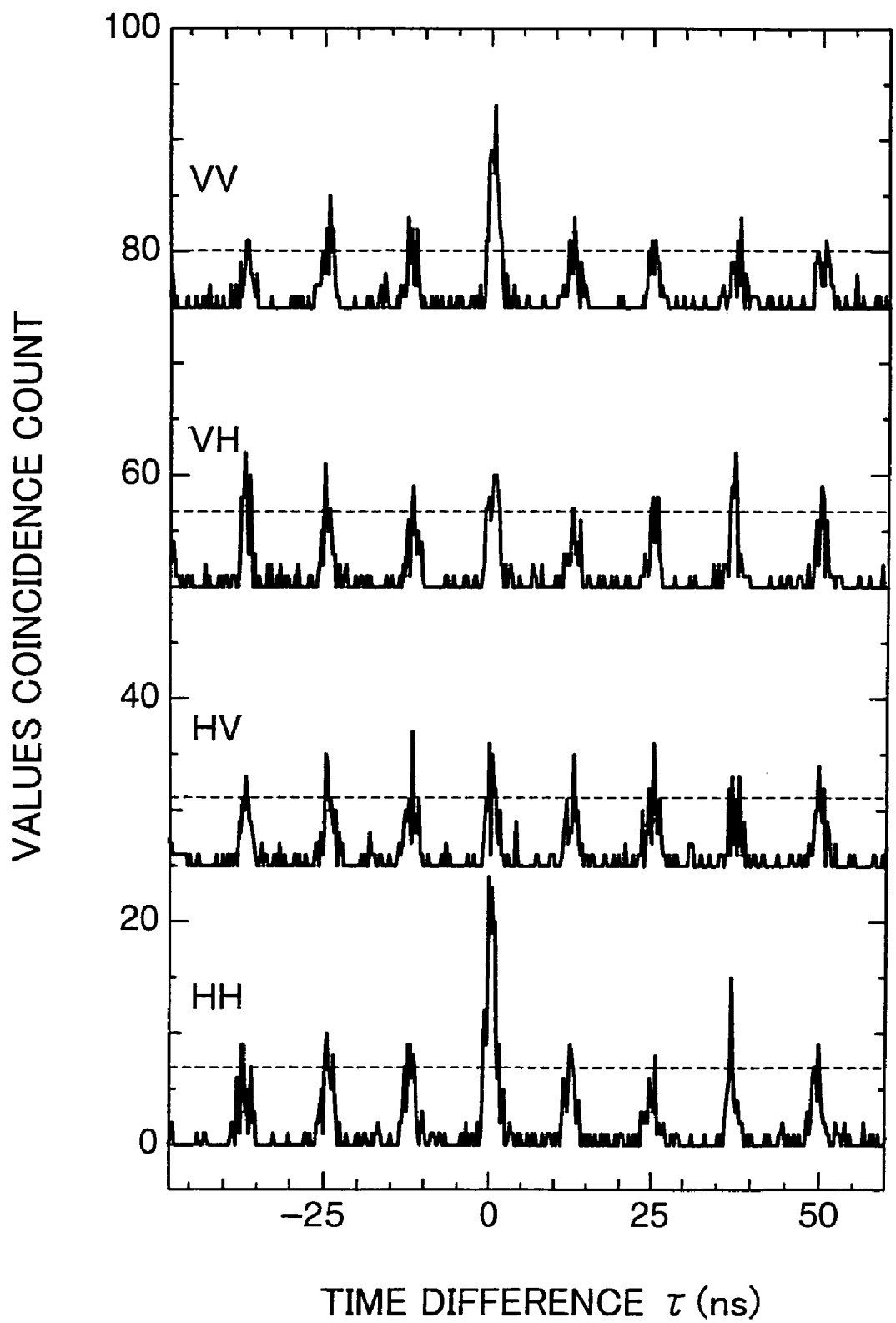
FIG. 5 is a graph illustrating temporal correlation between photons in combinations of linear polarization.
Figure 6:
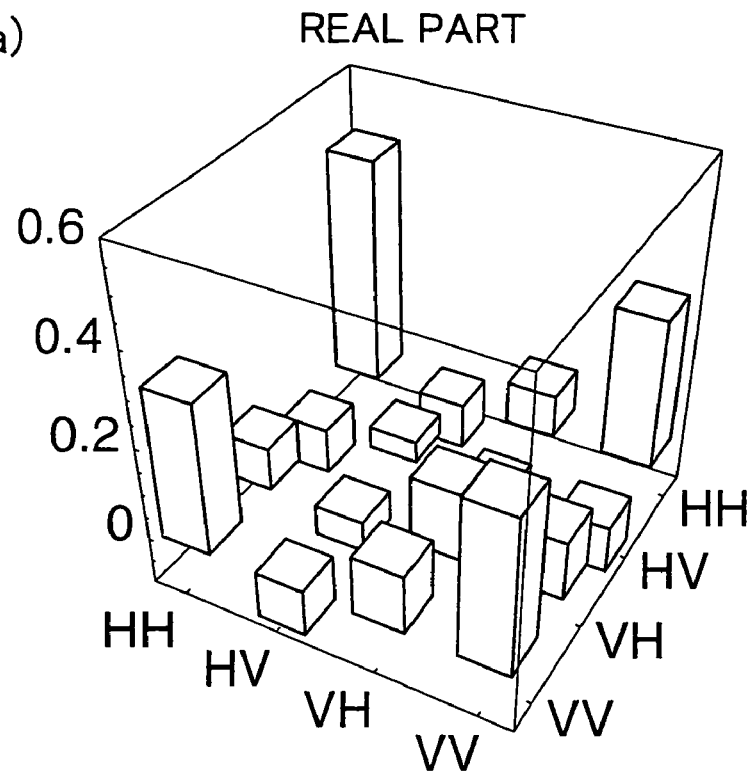
FIG. 6(a) is a view illustrating a real part of density matrix of two-photon polarization state, the density matrix being obtained from the correlation result of the photons.
FIG. 6(b) is a view illustrating an imaginary part of density matrix of two-photon polarization state, the density matrix being obtained from the correlation result of the photons.
Figure 6:
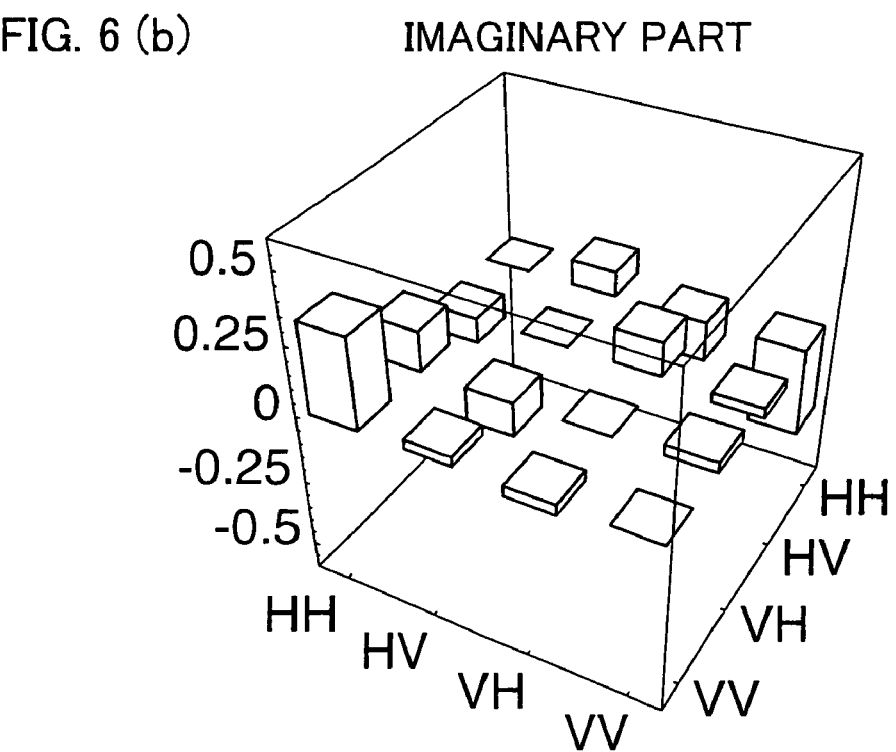

In FIG. 5, the time difference τ is plotted against the coincidence count of the photons, for four combinations (HH, HV, VH, and VV) of linear polarization light. H and V are polarization of photons, where H is horizontal linear polarization and V is vertical linear polarization. That is, HH shows the result obtained when both of the polarizers 22a and 22b were configured to let the light of horizontal linear polarization pass therethrough. Similarly, HV shows the result obtained when the polarizer 22a was configured to let the light of horizontal linear polarization pass therethrough and the polarizer 22b was configured to let the light of vertical linear polarization pass therethrough. VH shows the result obtained when the polarizer 22a was configured to let the light of vertical linear polarization pass therethrough and the polarizer 22b was configured to let the light of horizontal linear polarization pass therethrough. VV shows the result obtained when both of the polarizers 22a and 22b were configured to let the light of vertical linear polarization pass therethrough.

In FIG. 5, the dotted line indicates coincidence count of peaks other than the peak at the time difference τ=0, that is, the dotted line indicates the non-correlation peak components (components caused by photons that had been generated from different biexcitons and thus had no correlations therebetween). The comparison between the combinations (HH, HV, VH, and VV) in terms of the peak at the time difference τ=0 showed that the peaks obtained in HH and VV were high but the peaks obtained in HV and VH were as high as the non-correlation peak component. This indicates that one photon of the photon pairs scattered by RHPS showed horizontal linear polarization when the other showed horizontal linear polarization. This is in conformity with Equation (1). That is, the photon pairs were highly correlated with each other in terms of the linear polarization in conformity with Equation (1).

Furthermore, density matrix of two-photon polarization was worked out by measuring signals obtained in polarization combinations (≧16) of H (horizontal linear polarization), V (vertical linear polarization), R (right-circular polarization), L (left-circular polarization), D (linear polarization at 45°), and D' (linear polarization at −45°). FIGS. 6(a) and 6(b) respectively illustrate real part and imaginary part of the density matrix thus worked out.

As shown in FIGS. 6(a) and 6(b), the density matrix showed high intensity in |HH><HH|, |VV><VV|, |HH><VV|, and |VV><HH|. The combinations with off-diagonal components |HH><VV| and |VV><HH| showed coherence between |HH> state and |VV> state. Thus, the photon pairs generated in the combinations with off-diagonal components |HH><VV| and |VV><HH| were in the state of quantum entanglement with good coherence.

Fidelity F for the state Ψ is expressed as Equation (2):

$$F = \langle \Psi | \rho | \Psi \rangle \quad (2),$$

where ρ is the density matrix measured, and |Ψ> is state vector. In the present Example, it was assumed that the photon pairs had a state vector expressed as Equation (3):

$$|\Psi\rangle = \frac{1}{\sqrt{2}}(|HH\rangle + e^{i\theta}|VV\rangle). \quad (3)$$

The fidelity F for the observed state was 0.83. This significantly exceeds the classic limit (F=0.5). Thus, it was proved that the observed state held quantum entanglement, which was not attainable classically.

In the literature "S. Savasta, G. Martino, R. Girlanda, 'Solid State Communications' 111 (1999) p. 495-500", scattering by RHPS is theoretically pointed out, but does not show actual generation of photon pairs by experiment. Moreover, this literature does not disclose the feature that biexciton has angular momentum J=0. On the other hand, the inventors of the present invention succeeded, by experiment, to generate photon pairs being correlated with each other in terms of energy, momentum, and time, and holing quantum entanglement in terms of polarization. The inventors of the present invention generated such photon pairs by generating, in a semiconductor crystal, biexciton with angular momentum J=0 (ground state of biexciton).

Moreover, the wavelength of photons generated by conventional parametric down-conversion disclosed in the literature "C. Santoni, D. Fattal, M. Pelton, G. G. Solomon, and Y. Yamamoto, "Physical Review B" 66 (2002) 045308" is double that of the pump photons. On the other hand, the photons generated in the present Example had a wavelength substantially equal to that of the pump photons. According to the present Example, therefore, it becomes possible to generate quantum-entangled photons in a shorter wavelength than in the conventional art. In the present Example, the wavelength of the generated photons was approximately 390 nm (wavelength of ultraviolet band), which was substantially equal to that of the pump photons.

The photon pairs generated in the above mentioned manner shared one wave function expressed as Equation (1). Let photons of a photon pair sharing one wave function be photon A and photon B, and information to be transmitted from a sender to a receiver be information c, and let the sender have photon A and the receiver have photon B. The photon A and the photon C carrying the information c are caused to be in the state of quantum entanglement in terms of polarization, and observed in a commutable quantity. The quantum information is lost in accordance with the uncertainty principle, but the information carried by the photon C is transferred to photon B that is originally in the state of quantum entanglement with the photon A. That is, information c can be transferred instantaneously. This realizes quantum teleportation.

Moreover, the wavelength λ of light as classical electromagnetic wave can be regarded as de Broglie wavelength of one photon. Consider two photons paired in the state of quantum entanglement in terms of energy, momentum, and polarization, as described above. Let momentum of photons be p, then momentum of a system made up of two photons is 2p. Thus, the de Broglie wavelength λ2 in this system is expressed as:

λ2=h/2p=λ/2.

This is a half of the wavelength of one photon.

In the conventional optical lithography, the limit of the spatial resolution due to light diffraction makes it difficult to realize fabrication as fine as or finer than the order of light wavelength. However, the photon pairs generated by RHPS are correlated with each other in terms of time, energy, and momentum. Thus, the system in which the photons are paired as photon pairs, the de Broglie wavelength is approximately half of the wavelength of each photons. That is, de Broglie wavelength is the approximately half of the wavelength of the pump photons used for generating the biexciton. As a result, the quantum lithography using the quantum-entangled photon pairs has spatial resolution improved to be double that of the classical lithography. In the above embodiment, the wavelength of the photons in the quantum entanglement is approximately 390 nm, then the de Broglie wavelength of the photon pairs is approximately 195 nm. Thus, the use of the photon pairs in the quantum lithography makes it possible to realize fine fabrication of approximately 195 nm.

As described above, a method according to the present invention for producing a photon pair in quantum entangled state is arranged to include: radiating two parent photons to a semiconductor material, so as to induce two-photon resonance which generates biexciton that has an angular momentum of 0; and splitting the generated biexciton into two photons simultaneously, so as to generate the photon pair. With this arrangement, it is possible to generate photon pair in short wavelength and in the quantum entangled state in terms of the polarization.

Furthermore, it is preferable in the method according to the present invention that the semiconductor material be cuprous chloride.

CuCl, which has a relatively large band gap (approximately 3.4 eV), is suitable for generating photon pairs in a short wavelength such as ultraviolet band. Moreover, CuCl has a large binding energy for exciton and biexciton. Thus, CuCl allows both exciton and biexciton to exist therein in a very stable state under low temperature. This arrangement allows stable existence of the biexciton, which is generated as the intermediate product, thereby attaining more reliable generation of photon pair.

Furthermore, it is preferable in the method according to the present invention that the parent photons have a wavelength in the ultraviolet band.

As described above, the wavelength of the photons of the photon pair thus generated is substantially equal to that of the parent photons. Thus, this arrangement allows that the wavelength of the photon pairs thus generated is a short wavelength within the ultraviolet band. For example, the lithography using the photon pair thus generated can realize finer fabrication than can the conventional art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the present invention, it is possible to generate photon pairs correlated with each other in terms of energy, momentum, and time, and in a quantum entangled state regarding polarization. Because the photon pairs are in the quantum entangled state in terms of polarization, the photon pairs are applicable to quantum information/communication technology such as quantum cryptography, in which quantum teleportation is utilized. Moreover, the photons thus generated is in a short wavelength. This makes the photon pair applicable to quantum imaging technologies such as quantum lithography, which can exceed classical diffraction limit.

The invention claimed is:

1. A method for producing a photon pair in quantum entangled state, comprising;
   radiating two parent photons to a monocrystal semiconductor material, so as to induce two-photon resonance which generates biexciton that has an angular momentum of 0; and
   splitting the generated biexciton into two photons simultaneously, so as to generate the photon pair.

2. The method as set forth in claim 1, wherein the semiconductor material is cuprous chloride.

3. The method as set forth in claim 1, wherein the parent photons have a wavelength in the ultraviolet band.

* * * * *

UNITED STATES PATENT AND TRADEMARK OFFICE
CERTIFICATE OF CORRECTION

PATENT NO. : 7,683,361 B2 Page 1 of 1
APPLICATION NO. : 11/587003
DATED : March 23, 2010
INVENTOR(S) : Keiichi Edamatsu et al.

It is certified that error appears in the above-identified patent and that said Letters Patent is hereby corrected as shown below:

Title Page, Item (73) Assignee: should read:
--(73)  Assignee: Japan Science & Technology Agency,
Saitama (JP)

Tohoku University,
Miyagi, Japan--.

Signed and Sealed this

Twelfth Day of October, 2010

David J. Kappos
*Director of the United States Patent and Trademark Office*